(12) United States Patent
Friedlander et al.

(10) Patent No.: US 8,200,698 B2
(45) Date of Patent: Jun. 12, 2012

(54) OPTIMIZING DISTRIBUTED AND HYBRID QUERIES INCORPORATING TRUST MEASURES

(75) Inventors: Robert R. Friedlander, Southbury, CT (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/609,841

(22) Filed: Oct. 30, 2009

(65) Prior Publication Data

US 2011/0106854 A1    May 5, 2011

(51) Int. Cl.
*G06F 7/00* (2006.01)
(52) U.S. Cl. ......... 707/783; 707/694; 709/217; 715/741
(58) Field of Classification Search .................... 707/783
See application file for complete search history.

(56) References Cited

U.S. PATENT DOCUMENTS

| | | | |
|---|---|---|---|
| 5,694,590 A | 12/1997 | Thuraisingham et al. | |
| 5,901,287 A | 5/1999 | Bull et al. | |
| 6,021,405 A | 2/2000 | Celis et al. | |
| 6,606,627 B1 | 8/2003 | Guthrie et al. | |
| 6,820,082 B1 | 11/2004 | Cook et al. | |
| 7,032,006 B2 | 4/2006 | Zhuk | |
| 7,349,919 B2 | 3/2008 | Russell et al. | |
| 7,356,840 B1 | 4/2008 | Bedell et al. | |
| 7,523,118 B2 | 4/2009 | Friedlander et al. | |
| 7,584,160 B2 | 9/2009 | Friedlander et al. | |
| 7,590,630 B2 | 9/2009 | Richter | |
| 7,599,937 B2 | 10/2009 | Dutta et al. | |
| 2003/0126136 A1* | 7/2003 | Omoigui | 707/10 |
| 2004/0210550 A1* | 10/2004 | Williams et al. | 707/1 |
| 2005/0044478 A1* | 2/2005 | Ali et al. | 715/500.1 |
| 2007/0174285 A1 | 7/2007 | Dutta et al. | |
| 2008/0243521 A9 | 10/2008 | Coale et al. | |

* cited by examiner

*Primary Examiner* — Fazlul Quader
(74) *Attorney, Agent, or Firm* — John R. Pivnichny; Jim Boice

(57) ABSTRACT

A rules engine assigns a set of appropriateness rules to a particular data collection. The set of appropriateness rules describes an optimum usage for the particular data collection based on a source of the particular data collection and a type of activity that is deemed best suited to utilize the particular data collection. In response to determining that a requesting computer is implementing an activity that matches the particular set of appropriateness rules, a database controller is directed to transmit the particular data collection to the requesting computer.

16 Claims, 4 Drawing Sheets

| HEADING A | HEADING B | HEADING C |
|---|---|---|
|  |  |  |
|  |  |  |

306

| HEADING A | HEADING B | HEADING D |
|---|---|---|
|  |  |  |
|  |  |  |

304a

| HEADING A | HEADING B | HEADING C |
|---|---|---|
|  |  |  |
|  |  |  |

304b

| HEADING X | HEADING B | HEADING C |
|---|---|---|
|  |  |  |
|  |  |  |

OPTIMIZING DISTRIBUTED AND HYBRID QUERIES INCORPORATING TRUST MEASURES

BACKGROUND

The present disclosure relates to the field of computers, and specifically to the management of database queries. Still more particularly, the present disclosure relates to managing database queries based on trust measures for the databases.

BRIEF SUMMARY

A computer-implemented method, computer program product, and computer system for incorporating trust measures into a database are presented. A rules engine assigns a set of appropriateness rules to a particular data collection. The set of appropriateness rules describes an optimum usage for the particular data collection based on a source of the particular data collection and a type of activity that is deemed best suited to utilize the particular data collection. In response to determining that a requesting computer is implementing an activity that matches the particular set of appropriateness rules, a database controller is directed to transmit the particular data collection to the requesting computer.

BRIEF DESCRIPTION OF THE SEVERAL VIEWS OF THE DRAWINGS

FIG. 3 depicts an exemplary database from a data provider and exemplary databases being used by a data requester.

DETAILED DESCRIPTION

Figure 1:
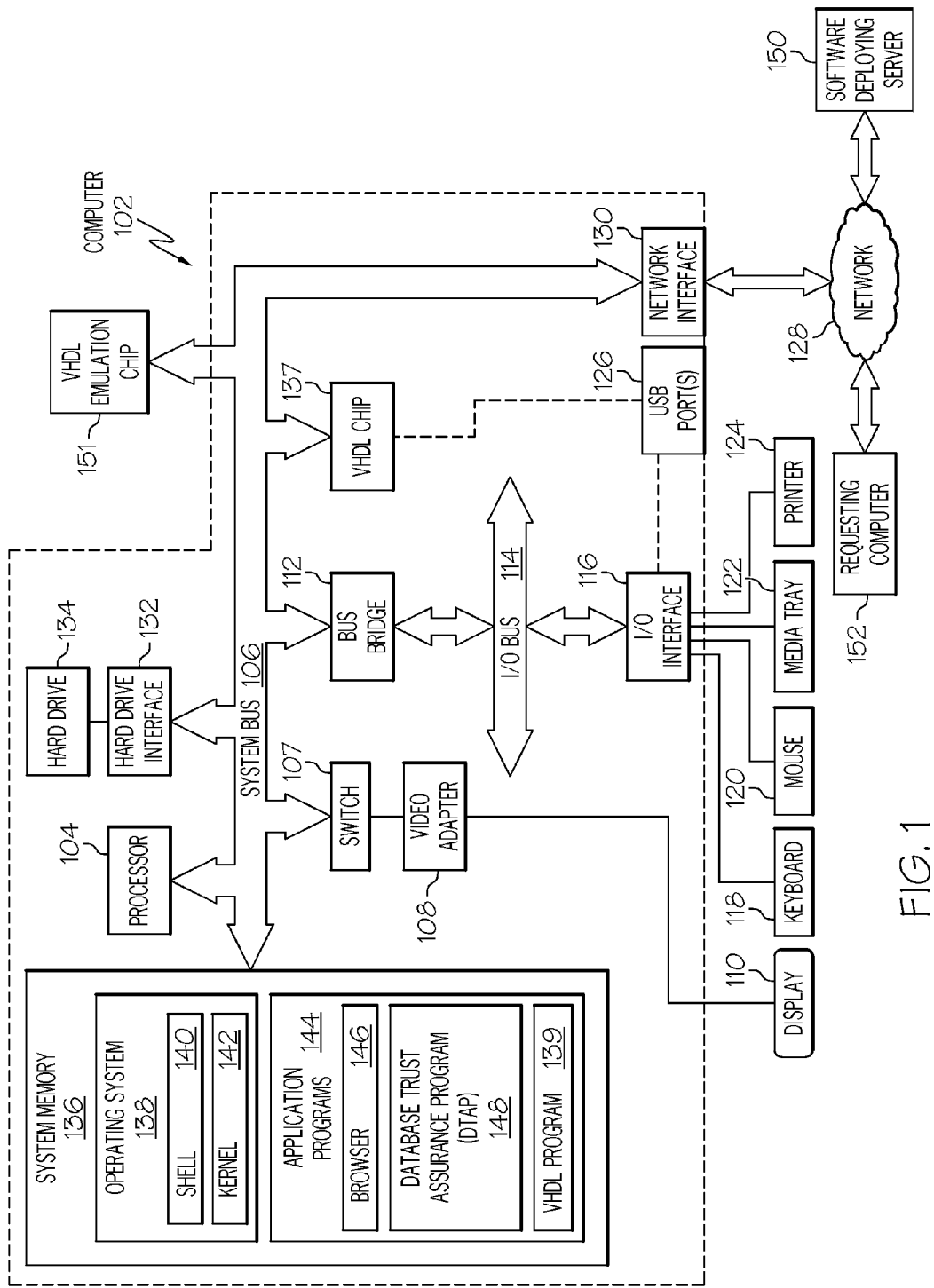
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or requesting computer 152, as well as requesting computer 202, database controller 204, and servers 212a-n shown in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., database trust assurance program-DTAP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a database trust assurance program (DTAP) 148. DTAP 148 includes code for implementing the processes described below, including those described in FIGS. 2-4. In one embodiment, computer 102 is able to download DTAP 148 from software deploying server 150, including in an on-demand basis. Note further that, in one embodiment of the present invention, software deploying server 150 performs all of the functions associated with the present invention (including execution of DTAP 148), thus freeing computer 102 from having to use its own internal computing resources to execute DTAP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from DTAP 148 causes VHDL program 139 to configure VHDL chip 137, which may be an FPGA, ASIC, etc.

In another embodiment of the present invention, execution of instructions from DTAP 148 results in a utilization of VHDL program 139 to program a VHDL emulation chip 151. VHDL emulation chip 151 may incorporate a similar architecture as described above for VHDL chip 137. Once DTAP 148 and VHDL program 139 program VHDL emulation chip 151, VHDL emulation chip 151 performs, as hardware, some or all functions described by one or more executions of some or all of the instructions found in DTAP 148. That is, the VHDL emulation chip 151 is a hardware emulation of some or all of the software instructions found in DTAP 148. In one embodiment, VHDL emulation chip 151 is a programmable read only memory (PROM) that, once burned in accordance with instructions from DTAP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
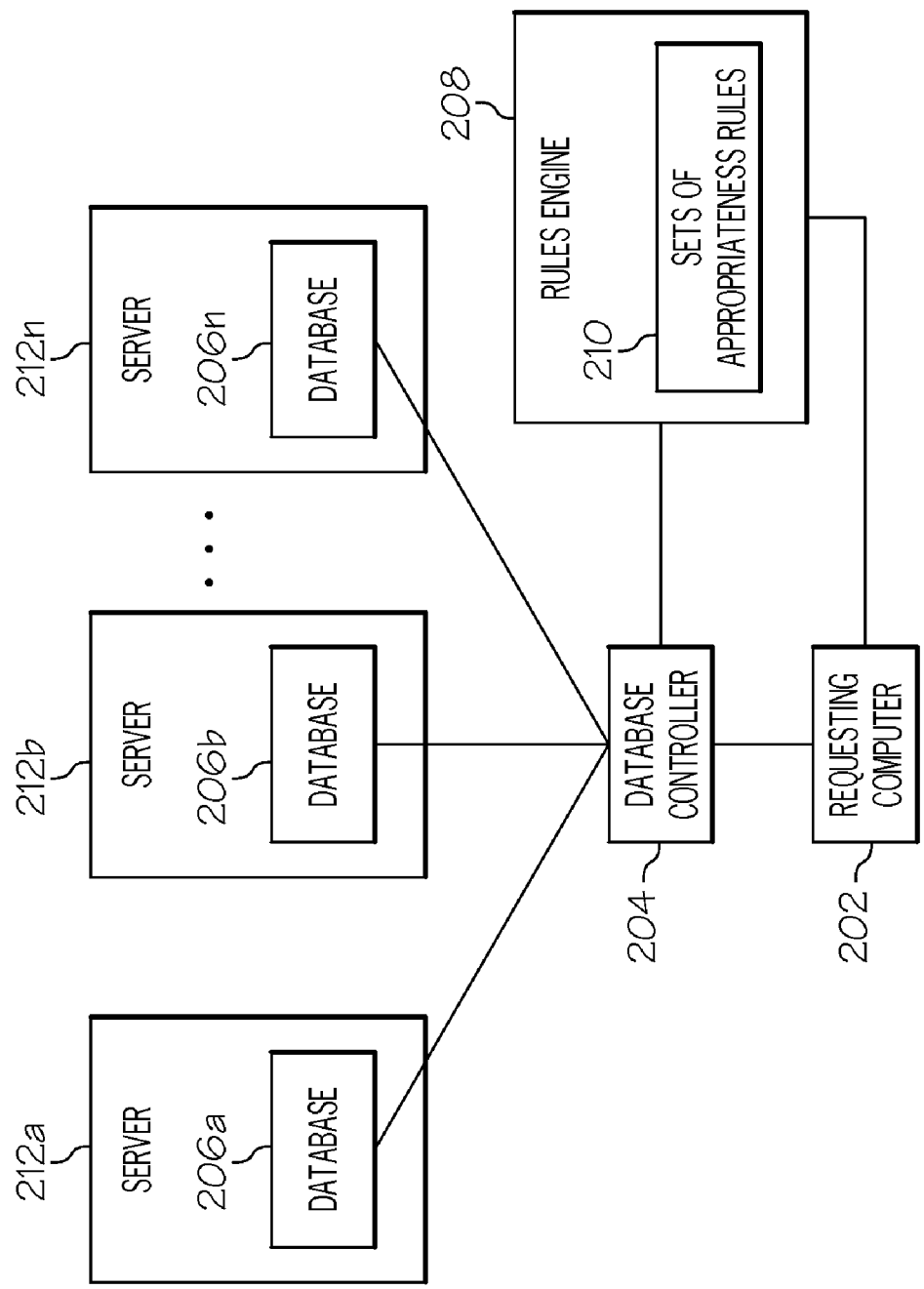
FIG. 2 illustrates a database network in which the present disclosure may be implemented.

With reference now to FIG. 2, an exemplary database network in which the present disclosure may be implemented is presented. Assume that a user of a requesting computer 202 has requested data for use on some particular type of operations/project/job. The requesting computer 202 sends a request for such data to a database controller 204, which controls access to multiple databases 206a-n (where "n" is an integer). Databases 206a-n may be on a single server or, as depicted, they may each be on a separate server 212a-n, which may or may not be dedicated to storing a particular type of data. The decision made by the database controller 204 as to which of the databases 206a-n is best suited to the needs of the requesting computer 202 is controlled, at least in part, by rules from a rules engine 208. These rules are set by the requesting computer 202, the database controller 204, and/or the databases 206a-n. The rules describe what parameters are best met by particular databases for a particular type of job. The rules can be consolidated in a set of appropriateness rules (e.g., sets of appropriateness rules 210) that describes an optimum usage for a particular data collection (from one or more of the databases 206a-n). Thereafter, when the requesting computer 202 requests a set of data, the rules engine 208 matches the activity being performed by the requesting computer 202 to the optimum database from databases 206a-n, and directs the database controller 204 to send that optimum database to the requesting computer 202. Note that in one embodiment, rules engine 208 and/or database controller 204 are software found in DTAP 148 shown in FIG. 1. In another embodiment, database controller 204 is a distinct unit of hardware, which may have some or all of the architectural components shown in FIG. 1 for computer 102.

As stated above, the set of appropriateness rules describes an optimum usage for a particular data collection. In one embodiment, this optimum usage is based on a source of a particular data collection. For example, assume that the requesting computer 202 is being used to aid in the diagnosis of a patient. Data from a medical records department of a hospital would be more desirable than records from a billing department, even though both departments would have databases that describe the patient's medical history. However, while the billing department's database would only describe the name and date of procedures performed, the medical records' database would provide details about such procedures, including lab results, surgical outcomes, etc.

In one embodiment, the optimum usage is based on a type of activity being performed by the requesting computer 202. Using the same example above, an operation, being performed on the requesting computer 202, related to diagnosing a patient would be better served by using data from the medical records department than from the billing department. Thus, based on the type of activity (patient diagnostics) being performed at the requesting computer 202, the set of appropriateness rules would match patient diagnostic work to the database from the medical records department.

In one embodiment, the set of appropriateness rules further describes a predetermined minimum acceptable turnaround time for providing a data collection to the requesting computer 202. Thus, if historical or heuristic evidence reveals that it would take the server for database 206a more than some predetermined upper time limit to return requested data, then the rules engine 208 may direct the database controller 204 to access data from database 206b, even if the content and format of database 206b are not as optimal as database 206a for use with the project being executed by requesting computer 202.

In one embodiment, the set of appropriateness rules further describes a minimum fill rate provided by a data collection, wherein a fill rate describes a percentage of local data fields that can be populated by the requesting computer with data from the data collection. For example, assume that the requesting computer 202 is executing a project that utilizes ten categories of data (e.g., ten columns in a spreadsheet). If database 206a is able to populate seven of those columns, this may or may not be deemed sufficient, depending on the parameters set by the set of appropriateness rules. If populating seven columns is enough, then the database 206a is acceptable and conforms to that appropriateness rule. If populating seven columns is too few, then database 206a will be rejected for use by rules engine 208.

In one embodiment, the set of appropriateness rules further describes matching a data collection requester's role to a data collection provider's role, wherein the data collection requester's role and the data collection provider's role describe role-based activities of users within at least one enterprise. That is, assume that a user of requesting computer 202 is an accountant working in a billing department of a hospital. Also assume that database 206a contains data that was provided by a primary health care provider, such as a doctor, a nurse, etc. A set of appropriateness rules, from the sets of appropriateness rules 210 in rules engine 208, may deem the information provided by the primary health care provider to be inappropriate for viewing by the accountant, and thus would prohibit access to database 206a for that user. In another embodiment, however, the data collection requester's role and the data collection provider's role may be the same. For example, the provider of the data in the database 206a and the requester using requesting computer 202 may both be health care providers. If so, then the set of appropriateness rules in rules engine 208 may deem the information provided by the primary health care provider to be appropriate for viewing by the requesting health care provider, and thus would permit access to database 206a for that user. As indicated above, however, if the roles of the data provider and the data requester are deemed significantly different, then access to database 206a may be blocked according to the set of appropriateness rules in rules engine 208.

In one embodiment, the set of appropriateness rules further describes a minimum refresh rate of data in a data collection. Thus, if the appropriateness rule requires data to be updated every day, and database 206a is only updated weekly, use of database 206a would be barred.

In one embodiment, the particular data collection that is requested is an amalgamation of data from different sources. That is, although database 206a-n are depicted as distinct databases that, optionally, are stored in separate database servers, each database from databases 206a-n may actually be a collection of data retrieved from separate servers. Nonetheless, the set of appropriateness rules 210 would still control access to these collections/amalgamations of data.

In one embodiment, the set of appropriateness rules further describes locating a least expensive source of the particular data collection. That is, assume that a set of appropriateness rules (from 210) sets the maximum allowable cost (financial cost, turnaround time, difficulty in accessing due to delays, quality of results, and/or manpower usage, etc.). If accessing a particular database from 206a-n is deemed too expensive by a particular appropriateness rule, then rules engine 208 will direct the database controller 204 to prevent access to the too expensive database, even if the too expensive database is deemed an excellent match to the needs of the requester. Note that all optimum usage and appropriate rule definitions may have upper and lower limits to be used in a cost:benefit analysis. That is, an appropriateness rule may be constructed such that any cost ceiling (financial, temporal, difficulty-based, resource use-based, etc.) is not exceeded by simply defining when a minimum level of appropriateness is reached. Once this minimum level is reached, then no further exploration for a "better fit" database is performed, thereby ensuring that the cost ceiling is not exceeded.

In one embodiment, overrides can be specified, such that the request can indicate the quality of a result set is paramount. Such an override allows for long running queries that typically would otherwise be barred by a governor that strictly limits and controls how the expensive sub-queries are executed (by dividing the sub-query into requests that do not exceed source resource constraints, and then storing and aggregating the results of each request until the overall request is completed).

In one embodiment, a secondary and/or tertiary copy of the data can be used and catalogued, particularly when a federated query is made against a single server. In such a condition, one or more of the sources needed to satisfy the query can be unavailable, resulting in the user receiving an error or exception message. By utilizing the methodology described herein, all secondary, tertiary, etc. copies of the data (disc, tape, other addressable medium) are catalogued together with details on latency, staleness, accessibility, etc. Under this embodiment, a database controller/query optimizer formulates alternative access strategies to solving the requesting query utilizing CRUD (create, read, update and delete) capabilities. A rules engine is used to substantiate the alternatives in conjunction with the database optimizer.

Furthermore, in one embodiment, each of these sources (secondary, tertiary, etc. data sources) are tagged with trust designations using a scaling measures to designate their acceptability in relation to usage to solve requestor query submissions down to datum level. Thus when a requester submits a request, an indication of minimum trust factor is also assigned. This trust factor can be set at the overall system level, the session level, or the specific request level. The selected level is then utilized in evaluating and determining an optimal access path based on known characteristics of the environment at the time of execution. Use of the trust factor can also influence which sources are used (or are expressly prohibited from use). Additionally, an extension describing only data that meets the trust factor is returned and the requestor is made aware of a limited result set due to trust factor restriction. The requester would then have the option to resubmit the request under the previously unsatisfied data requirements at a lower trust level, which would be then incorporated into an overall result set.

As noted above, in one embodiment each data collection (i.e., each of databases 206a-n) may be stored in a different server (depicted as respective servers 212a-n in FIG. 2). If so, then in one embodiment, the particular set of appropriateness rules may be assigned to a specific server, such that only that specific server is allowed to store and provide the particular data collection. By assigning the right to store a particular database to a particular server, then additional security can be provided for that particular database by limiting physical and/or logical access to that particular server.

In one embodiment, a requester of a data collection may be requesting data to populate multiple databases that have disparate data headings. That is, assume that a user of requesting computer 202 needs to populate three spreadsheets 302, shown in FIG. 3. Each of the user's databases (shown as spreadsheets 304a-c) has a set of column headings that may or may not be the same. For example, spreadsheet 304a has Headings A, B, D, spreadsheet 304b has Headings A, B, C, and spreadsheet 304c has Headings X, B, C, where each heading describes a different category of data. Spreadsheet 306 is a spreadsheet of data that is provided by one of the data provider's databases, such as database 206a shown in FIG. 2.

An appropriateness rule may be set to describe a minimum quantity of data headings in the particular data collection that can be used to populate the multiple databases that have disparate data headings. Thus, in the example shown in FIG. 3, spreadsheet 306 is able to populate a total of seven columns in spreadsheets 302 (two in 304a, three in 304b, and two in 304c). If populating seven out of nine columns is acceptable to the appropriateness rule, then spreadsheet 306 (and thus database 206a) can be accessed by a requester who is bound by that appropriateness rule. If not, then the rules engine 208 shown in FIG. 2 will prohibit the database controller 204 from allowing requesting computer 202 to access database 206a and/or server 212a.

Figure 4:
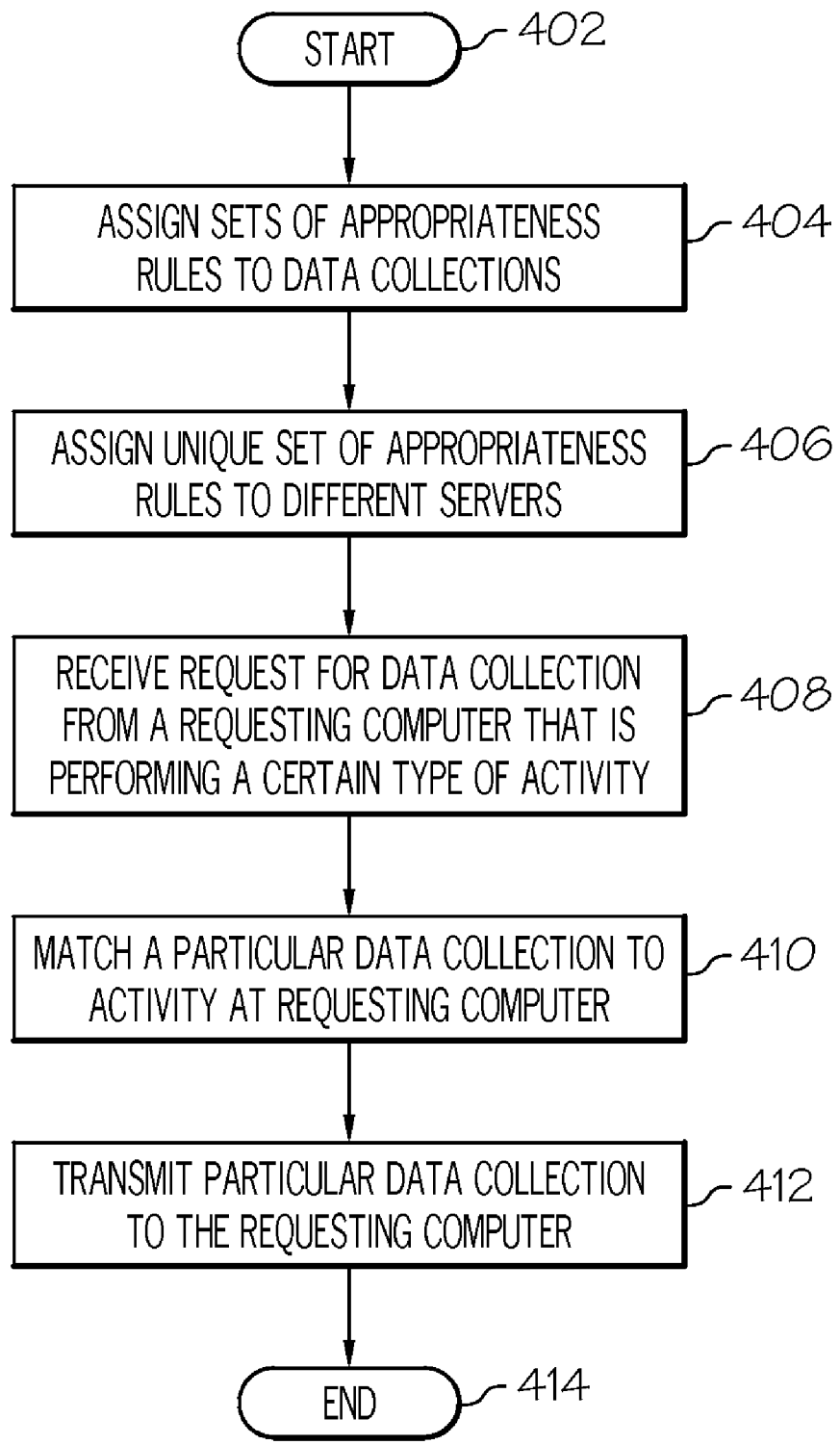
FIG. 4 is a high-level flow-chart of exemplary steps processed by a computer to incorporate trust measures into a database.

With respect now to FIG. 4, a high-level flow chart of exemplary steps taken to incorporate trust measures into a database is presented. After initiator block 402, sets of appropriateness rules are assigned to one or more data collections (e.g., databases 206a-n shown in FIG. 2), as described above and in block 404. Optionally, each of these sets of appropriateness may be assigned to different servers on which the databases are stored (block 406). That is, besides each database being stored on an assigned server, as described in one embodiment above, each server may also have its own set of appropriateness rules, such that appropriateness rules apply to the database only, to the server only, or to the database and the server in combination. Alternatively, an intermediate server may store one or more of the sets of appropriateness. These various permutations permit an additional level of granularity in assigning and utilizing rules to the databases and the servers on which they are stored. Note that in one embodiment, the sets of appropriateness rules are based on a trust factor set for a session between the requesting computer and the database controller. In another embodiment, the sets of appropriateness rules are set for the entire system (including the requesting computer and the database controller), and the trust levels are set for each of the data sources. Thus, in one embodiment the data collections are defined down to the datum level, rather than at a data collection level.

As indicated in block 408, a request for data from all or part of a database is received. This request is from a computer that is performing a certain type of activity, such as bookkeeping, maintaining medical records, inventory control, etc. A particular data collection (e.g., database or amalgamation of data) is then matched to that type of activity (block 410). Based on this matching, the appropriate data/database is then transmitted to the requesting computer (block 412), and the process ends (terminator block 414.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of incorporating trust measures into a database, the computer-implemented method comprising:
    a rules engine assigning a set of appropriateness rules to a particular data collection, wherein the set of appropriateness rules describes an optimum usage for the particular data collection based on a source of the particular data collection and a type of activity that is deemed best suited to utilize the particular data collection, wherein the set of appropriateness rules further describes a minimum fill rate provided by a data collection, wherein a fill rate describes a percentage of local data fields that can be populated by the requesting computer with data from the data collection, wherein the set of appropriateness rules further describes matching a data collection requester's role to a data collection provider's role, and wherein the data collection requester's role and the data collection provider's role describe role-based activities of users within at least one enterprise; and
    in response to determining that a requesting computer is implementing an activity that matches the set of appropriateness rules, the rules engine directing a database controller to transmit the particular data collection to the requesting computer.

2. The computer-implemented method of claim 1, wherein the set of appropriateness rules further describes a predetermined minimum acceptable turnaround time for providing a data collection to the requesting computer.

3. The computer-implemented method of claim 1, wherein the data collection requester's role and the data collection provider's role are the same.

4. The computer-implemented method of claim 1, wherein the data collection requester's role and the data collection provider's role are different.

5. The computer-implemented method of claim 1, wherein the set of appropriateness rules further describes a minimum refresh rate of data in a data collection.

6. The computer-implemented method of claim 1, wherein the particular data collection is an amalgamation of data from different sources.

7. The computer-implemented method of claim 1, wherein each data collection is stored in a different server, and wherein the computer-implemented method further comprises:
    assigning the set of appropriateness rules to a specific server, wherein only the specific server is allowed to store and provide the particular data collection.

8. The computer-implemented method of claim 1, wherein the set of appropriateness rules further describes locating a least expensive source of the particular data collection.

9. The computer-implemented method of claim 1, wherein a requester of a data collection is requesting data to populate multiple databases that have disparate data headings, and wherein the set of appropriateness rules further describes a minimum quantity of data headings in the particular data collection that can be used to populate the multiple databases that have disparate data headings.

10. The computer-implemented method of claim 1, wherein the set of appropriateness rules are based on a trust factor set for a session between the requesting computer and the database controller.

11. The computer-implemented method of claim 1, wherein the set of appropriateness rules are set for a system that comprises the requesting computer and the database controller, wherein unique trust levels are set for each of multiple data collections, and wherein trust levels for said each of multiple data collections are defined down to a datum level rather than at a collection level.

12. A computer program product for incorporating trust measures into a database, the computer program product comprising:
    a computer readable storage media;
    first program instructions for assigning a set of appropriateness rules to a particular data collection, wherein the set of appropriateness rules describes an optimum usage for the particular data collection based on a source of the particular data collection and a type of activity that is deemed best suited to utilize the particular data collection, wherein the set of appropriateness rules further describes a minimum fill rate provided by a data collection, wherein a fill rate describes a percentage of local data fields that can be populated by the requesting computer with data from the data collection, wherein the set of appropriateness rules further describes matching a data collection requester's role to a data collection provider's role, and wherein the data collection requester's role and the data collection provider's role describe role-based activities of users within at least one enterprise; and
    second program instructions for, in response to determining that a requesting computer is implementing an activity that matches the set of appropriateness rules, directing a database controller to transmit the particular data collection to the requesting computer; and wherein the first and second program instructions are stored on the computer readable storage media.

13. The computer program product of claim 12, wherein the set of appropriateness rules further describes a predetermined minimum acceptable turnaround time for providing a data collection to the requesting computer.

14. The computer program product of claim 12, wherein the first and second program instructions are downloaded to the computer readable storage media from a remote software deploying server in an on-demand basis.

15. A computer system comprising:
a processor, a computer readable memory, and a computer readable storage media;
first program instructions for assigning a set of appropriateness rules to a particular data collection, wherein the set of appropriateness rules describes an optimum usage for the particular data collection based on a source of the particular data collection and a type of activity that is deemed best suited to utilize the particular data collection, wherein the set of appropriateness rules further describes a minimum fill rate provided by a data collection, wherein a fill rate describes a percentage of local data fields that can be populated by the requesting computer with data from the data collection, wherein the set of appropriateness rules further describes matching a data collection requester's role to a data collection provider's role, and wherein the data collection requester's role and the data collection provider's role describe role-based activities of users within at least one enterprise; and
second program instructions for, in response to determining that a requesting computer is implementing an activity that matches the set of appropriateness rules, directing a database controller to transmit the particular data collection to the requesting computer; and
wherein the first and second program instructions are stored on the computer readable storage media for execution by the processor via the computer readable memory.

16. The computer system of claim 15, wherein the set of appropriateness rules further describes a predetermined minimum acceptable turnaround time for providing a data collection to the requesting computer.

\* \* \* \* \*